United States Patent [19]

Girsh

[11] 4,078,093

[45] Mar. 7, 1978

[54] HYPOALLERGENIC CHOCOLATE

[76] Inventor: Leonard S. Girsh, Benjamin Fox Pavilion, Old York and Township Line Rds., Jenkintown, Pa. 19046

[21] Appl. No.: 731,268

[22] Filed: Oct. 12, 1976

[51] Int. Cl.² .......................... A23G 1/02; A23G 1/00
[52] U.S. Cl. .................................. 426/593; 426/660; 426/631; 426/804; 426/656; 424/48
[58] Field of Search ............... 426/631, 660, 593, 804, 426/2; 424/48

[56] References Cited

U.S. PATENT DOCUMENTS

| | | | |
|---|---|---|---|
| 2,188,489 | 1/1940 | Veatch | 426/660 |
| 2,309,884 | 2/1943 | Bresnick | 426/631 |
| 2,487,931 | 11/1949 | Lataner | 426/660 |
| 3,754,928 | 8/1973 | Haney | 426/631 |

FOREIGN PATENT DOCUMENTS 647,408  12/1950  United Kingdom .................. 424/48

Primary Examiner—Jeanette M. Hunter
Attorney, Agent, or Firm—Seidel, Gonda & Goldhammer

[57] ABSTRACT

A hypoallergenic chocolate is prepared by treating cocoa powder so as to denature substantially all of the protein allergens which cause chocolate allergies. The cocoa powder with its denatured protein allergen is then mixed with sugar, cocoa butter, and other flavoring additives and further heat treated (and denatured) to produce the hypoallergenic chocolate. The hypoallergenic chocolate may be used itself or as a flavoring ingredient in various food products and other edible materials, including specifically prescribed hypoallergenic food substitutes and/or anti-allergic medications and other medicinal preparations.

10 Claims, No Drawings

HYPOALLERGENIC CHOCOLATE

BACKGROUND OF THE INVENTION

Many persons suffer from various allergies, many of which are caused by ingesting food containing allergens.

Although the biochemistry is not precisely understood, it is believed that the allergen causes a specific reagin to be formed in the bloodstream upon ingestion or other contact of the allergen with the body. The ability to produce reagins in response to a given allergen is thought to be an inherited characteristic that differentiates an allergic from a non-allergic person. The specificity of the allergen-reagin reaction and its dependence on molecular configuration of the allergen and reagin is similar to the antigen-antibody reaction. In this respect, the allergen molecule, which is often a protein, may be regarded as a key which exactly fits the corresponding structural shape of the reagin molecule, which may be likeened to a lock. When this occurs, an allergic reaction results.

Different materials contain different allergens. Not all persons can form the appropriate reagin with which the allergen from a specific source can react and are therefore not allergic to that particular allergen containing substance. When someone does produce a particular reagin in response to the presence of the specific allergin, an allergic reaction results. Allergic reactions range from very mild symptoms, such as minor skin rashes (allergic eczema and urticaria), dermal, respiratory, including allergic rhinitis and bronchial asthma, gastrointestinal, migraine allergic type symptoms, to violent manifestations of these illnesses. Violent illnesses have been known to even include shock-like reaction, vascular collapse, allergic anaphylaxis, and for some people under certain conditions, death.

Many allergists have recognized that chocolate contains proteins which are allergens. The allergens in chocolate frequently cause the formation of reagins in many persons. Thus, many persons are allergic to chocolate, and chocolate allergy is common in both adults and children. The symptoms may include mild to severe allergic skin eruptions, respiratory tract allergy (allergic rhinitis and asthma), severe gastro-intestinal reactions, migraine, and allergic anaphylaxis.

Chocolate is a very frequently used and popular food product. It is used not only in confections such as candy, cookies, ice cream and syrup, but also as a flavoring for other food products, such as breakfast cereals, hot and cold beverages, desserts and nonfood products, such as medicines. Because of the widespread use of chocolate flavored products, due primarily to their pleasing taste, there is a great need for a hypoallergenic chocolate having a taste equal to that of the presently available chocolate which causes allergic reactions.

Chocolate is manufactured from beans of the *Theobroma cacao* tree. The beans are received by the chocolate manufacturer who processes the beans by cleaning, roasting, hulling, blending, and grinding them. As the shells are removed, the beans are broken into fragments called nibs. The nibs are then finely ground and chocolate liquor is produced. The mixture of cocoa butter, a tasteless fat, and cocoa in the finely ground nibs forms a free-flowing substance called chocolate liquor.

It is this chocolate liquor which is used in most chocolate flavored food products. This chocolate liquor also contains the protein allergens which cause chocolate allergy. The chocolate liquor comprises cocoa butter and cocoa powder. When chocolate liquor is heated and placed under pressure, the cocoa butter is squeezed out of the chocolate liquor and separated from the remaining mass of material. This remaining mass is then finely ground to produce cocoa powder. Since the cocoa butter is simply a tasteless fat, it is the cocoa powder which contains all of the protein allergens. Although cocoa powder is used in many chocolate flavored products, most often chocolate liquor is used to impart the chocolate flavor to food products, such as chocolate bars.

Bresnick, in U.S. Pat. No. 2,309,884, teaches a method of producing a hypoallergenic chocolate product by extracting the phosphatide constituent contained therein prior to roasting. It is stated in this patent that a normal roasting operation ordinarily decomposes the phosphatide constituents. The patentee believes that the phosphatide constituent in its depolymerized state causes gastric distress.

There is no extraction process in the present invention. The cocoa powder is treated so that substantially all of the protein allergens are denatured. Furthermore, gastric distress and other symptoms of chocolate allergy have been reduced by the present invention, without resorting to the extra step of phosphatide extraction prior to roasting.

Lataner, in U.S. Pat. No. 2,487,931, discloses an edible product comprising an edible fat, an edible non-crystallizable powdered material and sugar. The edible fat may be cocoa butter, among other edible fats, and the edible non-crystallizable powdered material may be cocoa powder, among other powders such as milk powder, tri-calcium phosphate, flour, starch, or the like. The solid ingredients are mixed at an elevated temperature, from about 110° F to 190° F, as is customary in producing standard chocolate products. The mixture of solid ingredients is then heated with water and sugar at a temperature of at least 150° F to dissolve at least the major portion of the sugar and to reduce the water content if necessary.

In each example where cocoa butter is used with cocoa powder, it is in the form of chocolate liquor. In examples II and III, additional cocoa butter is added to the chocolate liquor. There is no teaching that the cocoa butter and cocoa powder be added together as separate ingredients. Furthermore, there is no teaching or suggestion that the chocolate product formed in the Lataner patent is hypoallergenic. Nor is there exclusion of equally offensive allergens, such as flour (wheat) and starch (usually corn in origin) as well as exclusion of milk and milk products (powdered milk or milk sugar).

SUMMARY OF THE INVENTION

The present invention is concerned with treatment of cocoa powder to denature substantially all of the the protein allergens contained therein so that the proper structural relationship cannot be maintained with the reagins in the blood stream of the persons having chocolate allergy. Thus, an allergic reaction may be prevented when eating chocolate made from the cocoa powders of the present invention. Further, the intentional exclusion of other common allergens, such as wheat, milk, milk sugar (lactose), corn, beet sugar as a source of sucrose (cane sugar is used instead) and egg in products made from this hypoallergenic chocolate is preferred.

A hypoallergenic chocolate according to the present invention is prepared comprising cocoa powder, cocoa butter and sugar where the cocoa powder and cocoa butter are added as separate ingredients, rather than as the combined chocolate liquor. The cocoa powder is prepared and mixed with the other ingredients and is treated to denature substantially all of the protein allergens contained therein.

The hypoallergenic chocolate produced in accordance with this invention has substantially the same taste and mixing characteristics of non-hypoallergenic chocolate.

DETAILED DESCRIPTION OF THE PREFERRED EMBODIMENTS

The hypoallergenic chocolate of the present invention is prepared by treating the cocoa powder to denature the protein allergens contained therein. The cocoa powder is then mixed with cocoa butter and sugar and further treated to denature substantially all of the protein allergens contained in the cocoa powder. While I do not wish to be bound by any particular theory, it is believed that by denaturing substantially all of the protein allergens contained within the cocoa powder, the molecular configuration of the protein allergens are altered. Thus, the structure of the allergen "key" does not properly coincide with the specific reagin "lock". Since the allergens cannot properly combine with the reagins, the allergic reaction does not occur and in a sense is blocked.

Prolonged heat treatment is the presently preferred method according to the invention for denaturing substantially all of the protein allergens contained in the cocoa powder. The heating must be sufficient to denature substantially all of the protein allergens, but should not be excessive, mainly for economy reasons and the risk of altering or disturbing the taste. A hypoallergenic chocolate may be prepared by a two step process.

In the first step, cocoa powder is prepared by heating the ground nibs of roasted cocoa beans at a temperature of from about 215° F to about to 300° F in a hydraulic press at a pressure from about 5500 to about 8000 pounds per square inch, for from about 15 to about 90 minutes. Beans used for cocoa production are usually roasted at temperatures about 15° to 20° F higher (about 240° F) than beans used for production of chocolate liquor (about 220° F). Because of the exceedingly high pressures concurrent with high temperatures, the mass from which cocoa is produced may be considered superheated. The majority of the protein allergens are denatured by this first step.

In the second step, the cocoa powder prepared in the first step is mixed as a separate ingredient along with cocoa butter and sugar and is further treated at a temperature of 180° F to 190° F for at least 48 hours, and preferably from 48 to 96 hours. The cocoa powder and cocoa butter may not be mixed in the form of chocolate liquor since, as described below, the prolonged heating required to denature the protein allergens has an adverse effect on the taste of the chocolate liquor. Moreover, although it is not certain, the presence of the cocoa butter in the chocolate liquor may in some way interfere with the denaturation of the protein allergens; also, removing the fat from the lipoprotein in cocoa production may additionally disrupt the chocolate protein allergen.

Optional flavoring ingredients may be added, such as vanillin. If only mild allergy to milk is present, 10% to 15% (ten to fifteen %) super heated milk solids might be added to make milk chocolate.

A hypoallergenic chocolate may be made by mixing from about 13 to about 18 (eighteen) weight percent of the protein denatured cocoa powder, from about 30 to about 45 weight percent cocoa butter, and from about 44 to 55 weight percent sugar. The term "weight percent" as used in this specification and claims is based on the total weight of the chocolate composition.

The preferred sugar is sucrose, preferably of cane sugar origin rather than of beet sugar origin, because of potential allergenicity of sucrose produced from beet sugar.

The hypoallergenic chocolate produced in accordance with the present invention may be used in the instances where regular, non-hypoallergenic chocolate is presently used. Thus, it may be used in solid food products, such as candy, cookies, breakfast cereals, etc. It may be used in semi-solid foods such as ice cream, syrups, puddings, etc. Further, it may be used in both hot and cold chocolate flavored beverages. Moreover, because of the pleasing taste of the hypoallergenic chocolate produced in accordance with the present invention, it might also serve as a flavoring for medications, other hypoallergenic foods, and anti-allergic medications. Preferably, other common allergens are also excluded in these products.

The heating under extreme pressure, coupled with the further prolonged heating of the cocoa powder, sugar and cocoa butter mixture, by which substantially all of the protein allergens are denatured does not have any significant effect on the taste of the hypoallergenic chocolate. That is, the hypoallergenic chocolate of the present invention tastes substantially like the presently available non-hypoallergenic chocolate.

The invention will now be described in more detail with reference to the following specific, non-limiting examples:

EXAMPLE I

Cocoa powder was formed by being heated at temperatures of about 235° to about 245° F at extreme pressure of about 6000 pounds per square inch for about 30 minutes. A hypoallergenic chocolate composition was prepared by mixing 14 weight percent of this cocoa powder, 33 weight percent cocoa butter and 53 weight percent sugar (sucrose). The mixture was then heated for 48 hours at 180° F.

The hypoallergenic chocolate was then centrifuged at 6000G and analyzed. 95% to 100% of the chocolate protein was found to be insoluble in 10 mM phosphate buffer pH 7.2. This almost complete insolubility of the chocolate protein contained in the hypoallergenic chocolate produced in accordance with the present invention is an objective indication that the chocolate protein has been denatured to the point where substantally all of the protein allergens have been denatured.

In contrast, only 73% of the chocolate protein was found to be insoluble upon centrifuging at 6000G a composition prepared using chocolate liquor heated for 2 additional hours at 180° F in place of the cocoa powder treated in accordance with the present invention. The step of heating to 245° F with 6000 lbs./square inch pressure was omitted since chocolate liquor would no longer remain intact but would be converted to cocoa powder.

The taste of this hypoallergenic chocolate was substantially identical to the taste of the non-hypoallergenic chocolate as prepared above. When chocolate liquor was substituted for the cocoa powder and cocoa butter in the above hypoallergenic chocolate composition and was heated at 180° F for 4 hours there was an adverse alteration of taste. Therefore, further additional heating was not practical.

EXAMPLE II

Hypoallergenic chocolate bars were prepared in accordance with the composition of Example I. These were administered to 89 patients known to have a chocolate allergy. In several of these patients, their intolerance to non-hypoallergenic chocolate had been of such severity that a very small piece of chocolate caused generalized allergic eczema within a few hours, gastroenteritis and diarrhea of severe degree within a few minutes, and severe migraine and gastroenteritis, associated with bloody diarrhea within a few hours.

The results were as follows:

|  | Number of Patients | Percent of Total | Children | Adults |
|---|---|---|---|---|
| Symptom - Free with Ingestion of Hypoallergenic Chocolate | 67 | 75.28% | 44 | 23 |
| Only Mild Symptoms With Hypoallergenic Chocolate vs. Chocolate | 11 | 12.36% | 4 | 7 |
| % Improved with Hypoallergenic Chocolate vs. Chocolate | | 87.64% | | |
| No Difference With Hypoallergenic Chocolate vs. Chocolate | 9 | 10.11% | 3 | 6 |
| Apparent Slight Benefit With Hypoallergenic Chocolate vs. Chocolate | 2 | 2.24% | 2 | 0 |
| Total | 89 | 99.99% | 53 | 36 |

Thus, as clearly shown, the hypoallergenic chocolate of the present invention is highly effective in preventing allergic reactions in those having a chocolate allergy when they ingest the hypoallergenic chocolate of the present invention rather than the usual, non-hypoallergenic chocolate.

The present invention may be embodied in other specific forms without departing from the spirit or essential attributes thereof and, accordingly, reference should be made to the appended claims, rather than to the foregoing specification as indicating the scope of the invention.

I claim:

1. A hypoallergenic chocolate prepared by the method comprising the steps of:
   (a) denaturing substantially all of the protein allergens contained in cocoa powder; and
   (b) mixing as separate ingredients said cocoa powder containing denatured protein allergens with cocoa butter and sugar.

2. A hypoallergenic chocolate according to claim 1 comprising mixing about 13 to about 18 weight percent of said cocoa powder containing denatured protein allergens with about 30 to about 45 weight percent cocoa butter and about 44 to about 55 weight percent sugar.

3. A medicinal product containing a sufficient amount of the hypoallergenic chocolate of claim 1 to impart a chocolate flavor to said product.

4. A substantially solid food product containing a sufficient amount of the hypoallergenic chocolate of claim 1 to impart a chocolate flavor to said product.

5. A beverage containing a sufficient amount of the hypoallergenic chocolate of claim 1 to impart a chocolate flavor to said beverage.

6. A hypoallergenic food product containing a sufficient amount of the hypoallergenic chocolate of claim 1 to impart a chocolate flavor to said hypoallergenic food product, wherein said hypoallergenic food product is hypoallergenic with respect to other allergens in addition to chocolate allergens.

7. A hypoallergenic chocolate according to claim 1 wherein about 95% to 100% of the chocolate protein in said hypoallergenic chocolate is insoluble in phosphate buffer after centrifugation at 6000 G.

8. A hypoallergenic chocolate prepared by the method comprising the steps of:
   (a) denaturing protein allergens contained in cocoa powder by heating said cocoa powder at a temperature of about 215° F to about 300° F in a hydraulic press at a pressure of about 5000 to about 8000 lbs./square inch for about 15 to about 90 minutes;
   (b) mixing said heated cocoa powder with cocoa butter and sugar, each being added as a separate ingredient; and
   (c) heating said mixture at a temperature of about 180° F to about 190° F for at least 48 hours to denature substantially all of the protein allergens contained in said cocoa powder.

9. A hypoallergenic chocolate according to claim 8 wherein said denaturing step (a) comprises heating said cocoa powder to a temperature of about 215° F to about 300° F in a hydraulic press at a pressure of about 5500 to about 8000 lbs./square inch for about 15 to about 90 minutes, said mixing step (b) comprises mixing about 13 to about 18 weight percent of said cocoa powder containing denatured protein allergens with about 30 to about 45 weight percent cocoa butter and about 44 to about 55 weight percent sugar, and said heating step (c) comprises heating said mixture at about 180° F to about 190° F for about 48 to about 96 hours.

10. A hypoallergenic chocolate according to claim 8 wherein said denaturing step (a) comprises heating said cocoa powder to about a temperature of about 235° F to about 245° F in a hydraulic press at a pressure of about 6000 lbs./square inch for about 30 minutes, said mixing step (b) comprises mixing about 13 to about 18 weight percent of said cocoa powder containing denatured protein allergens with about 30 to about 45 weight percent of said cocoa butter and about 44 to about 55 weight percent sugar, and said heating step (c) comprises heating said mixture at about 180° F for about 48 hours.

* * * * *